Dec. 15, 1931.                F. SINGER                 1,836,821
HEAT AND PRESSURE RESISTING TOOLS
Filed July 10, 1930
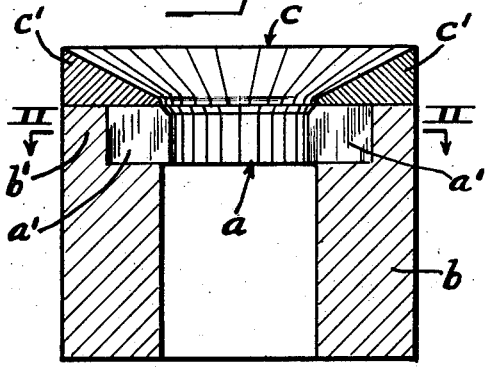
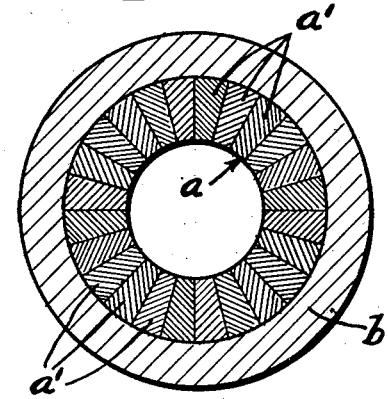
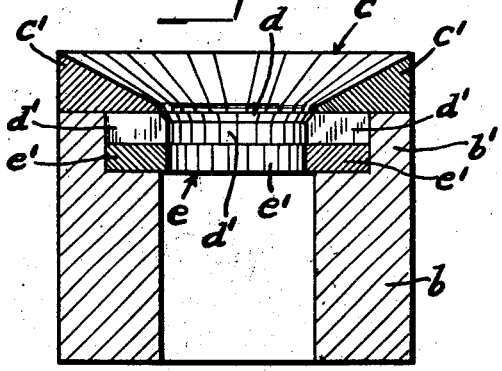
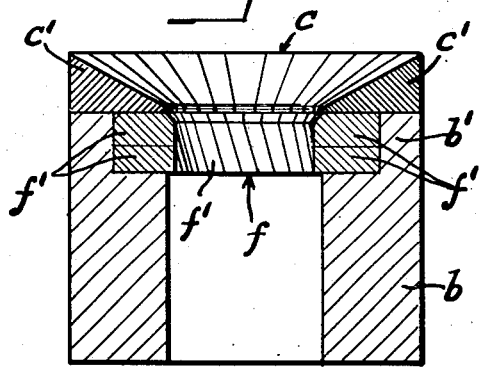

Patented Dec. 15, 1931

1,836,821

UNITED STATES PATENT OFFICE

FRITZ SINGER, OF NUREMBERG, GERMANY

HEAT AND PRESSURE RESISTING TOOLS

Application filed July 10, 1930, Serial No. 467,116, and in Germany July 2, 1928.

My invention pertains to ring-shaped tools (which term is intended to include ring-shaped tool and machine parts) such as are required to resist the stresses resulting from the high temperatures and high pressures encountered in carrying out the hot extrusion process. The invention is particularly applicable to tools such as are employed in the hot extrusion of tubes and solid shapes, especially from hard and semi-hard metals such, for instance, as brass and steel.

Tools used under the conditions above referred to, and particularly in the extrusion of hard and semi-hard metals, are subject to more or less rapid deterioration, and it has been found that this deterioration is less due to wear than to the formation of cracks resulting from the violent changes of temperature and pressure to which the tools are subjected. It is a major object of my invention to obviate this deterioration of the tools by the formation of cracks therein. A further object of my invention is to facilitate, and in some cases for the first time render possible, the production of tools of this character from metal alloys and compounds, which, by reason of their special strength, wear resisting properties, etc., are desirable for the purpose, but which (because of the conditions requiring to be met in producing them) either cannot be produced, or can only be produced with great difficulty, otherwise than in relatively small pieces.

I attain the above objects by making the required tool of composite form, it being composed of a plurality of sections the number of which corresponds, as closely as it may within the limits of economical manufacture, with the number of cracks which manifest themselves in the use of a tool which is similar but made in one piece. As one example, a matrix die ring for use in extrusion is made up from a plurality of segments arranged as in the commutator of a dynamo, these segments being secured in position, as, for instance, by shrinking upon them an outer ring or a ring-shaped portion of the matrix die body. Tools of greater length,—as, for example, the inner bushings of containers from which metal is to be extruded,—may be composed of a plurality of segment bars, or, if such tools are constituted by a number of short rings, such rings may themselves be made up of a plurality of segments.

Several forms of tools embodying my invention,—matrix die rings for use in hot extrusion having been selected for illustration as this is one of the important uses,—are shown in the accompanying drawings. It is to be understood, however, that the tool may take still other forms than those shown, without exceeding the scope of the invention as defined in the appended claims.

In the drawings:

Fig. 1 is a sectional elevation of a simple form of matrix die ring constructed in accordance with my invention, shown as mounted, by shrinking, in a recess of a die body and as having a billet bearing ring associated with it;

Fig. 2 is a section on the line II—II of Fig. 1;

Fig. 3 is a view similar to Fig. 1 but showing the matrix die ring as constituted by a plurality of rings (in this case two) the sections of each ring being staggered with relation to those of the adjacent ring; and Fig. 4 is a view similar to Fig. 1, but showing a form of matrix die ring in which the planes of engagement of the sections thereof are oblique to planes radial to the axis of the ring.

Referring now to Figs. 1 and 2, $a$ represents the matrix die ring, which is the member of the matrix die that is subjected to the greatest stresses. This die ring is composed of a plurality of segments $a'$ arranged in a similar manner to the segments of a commutator. Though the sections $a'$ may be retained in position in other ways, they are shown as secured upon the die body $b$ by being shrunk within the wall $b'$ of an annular recess formed in the top of the die body.

Upon the die body and die ring is mounted the billet bearing ring $c$, and, if desired, this ring also may be composed of a plurality of segments, indicated at $c'$.

In Fig. 3 there is shown an embodiment of my invention in which the matrix die ring is constituted by two rings $d$ and $e$ superposed one on the other, though more than two might be used if found desirable. The rings $d$ and $e$ are made up of sections, $d'$ and $e'$, as before, but the sections of one ring are staggered with respect to those of the other ring. Thus should wear and tear deteriorate the rings at the lines where their sections adjoin one another, the opportunity for such deterioration to manifest itself in the form of lines on the extruded product is minimized, and the useful life of the matrix die ring is thereby lengthened.

In Fig. 4 the matrix die ring is shown as constituted by but one ring, as in Figs. 1 and 2, such ring being designated in that figure as $f$; but the sections $f'$ are so shaped that their meeting faces are oblique to planes extending radially from the axis of the ring. In this way deterioration of the ring at the lines where its sections adjoin one another is minimized, and, in any case, the formation of lines upon the extruded material, due to such deterioration, is prevented.

I may use such materials as chill castings, stellites, fritted carbides of wolfram, as Widia metal, steels having a high percentage of wolfram, and the like, in making the segments, and am enabled by my invention to obtain the benefit of their great hardness and resistance to wear and tear without suffering the drawback that cracks are liable to appear in the tool because of the brittleness which inevitably characterizes such materials.

A further advantage of my inevention lies in the fact that by it I am enabled to produce relatively large tools from compounds of heavy metals, such as fritted carbides of wolfram, which heretofore it has only been possible to produce in relatively small pieces. For instance, the fritted carbide known as Widia metal is of exceptional hardness, but because of limitations encountered in its manufacture, it has not been possible to produce it in pieces of large size. The desired qualities of this and kindred metals become available to a greatly increased extent as a result of my invention.

I claim:

1. A ring-shaped hot extrusion die comprising a composite member made up of a plurality of sections of heat and pressure-resisting metal, said sections having their adjoining planes disposed substantially lengthwise of such member, and an enclosing member surrounding said composite member to retain such sections solidly in position, as and for the purposes set forth.

2. A ring-shaped hot extrusion die comprising a composite member made up of a plurality of sections of heat and pressure-resisting metal, said sections having their adjoining planes disposed substantially radial to and in line with the axis of such member, and an enclosing member shrunk around said sections to retain them solidly in position, as and for the purposes set forth.

3. A ring-shaped hot extrusion die comprising a composite member made up of a plurality of sections of heat and pressure-resisting metal, said member being composed of a plurality of layers of sections, the sections in successive layers having their adjoining planes disposed substantially lengthwise of such member and being disposed so that the planes of engagement of the sections of one layer are staggered with respect to the planes of engagement of those of the adjoining layer, and an enclosing member surrounding said composite member to retain such sections solidly in position, as and for the purposes set forth.

4. A ring-shaped hot extrusion die comprising a composite member made up of a plurality of sections of heat and pressure-resisting metal, said sections having their adjoining planes disposed oblique to the axis of such member, and an enclosing member surrounding said composite member to retain such sections solidly in position, as and for the purposes set forth.

In testimony whereof, I hereunto sign my name.

FRITZ SINGER.